United States Patent [19]

Dietrich

[11] 4,211,509
[45] Jul. 8, 1980

[54] WEAR AND ALIGNMENT SLEEVE FOR POWER TOOL

[76] Inventor: Otto E. Dietrich, 617 W. Jackson St., Morton, Ill. 61550

[21] Appl. No.: 961,399

[22] Filed: Nov. 16, 1978

[51] Int. Cl.² .................................................. B23B 39/20
[52] U.S. Cl. ........................................ 408/35; 408/141
[58] Field of Search ................. 408/35, 141, 142, 117, 408/118, 56; 29/26 A, 40, 26 R, 48.5

[56] References Cited

U.S. PATENT DOCUMENTS

| 431,108 | 7/1890 | Cowley | 408/117 |
|---|---|---|---|
| 790,484 | 5/1905 | Denyes | 408/117 |
| 1,460,219 | 6/1921 | Ziloccki | 408/117 |
| 2,303,565 | 5/1941 | Luna | 176/163 |
| 2,764,044 | 9/1956 | Schrieder | 408/35 X |
| 2,991,666 | 7/1961 | Charlat | 408/35 X |

FOREIGN PATENT DOCUMENTS 148700  10/1931  Switzerland ........................ 408/35

Primary Examiner—Gil Weidenfeld
Attorney, Agent, or Firm—James R. Bell

[57] ABSTRACT

A power tool includes a turret rotatably mounted on a hub, a first shaft rotatably mounted in the hub and a second shaft mounted for rotation in the turret and for aligned rotating engagement with the first shaft in the hub. A sleeve is provided in the hub for limiting wear between the rotating shafts in the hub and for enhancing alignment between the shafts. Means are provided for venting between the first and second shafts.

5 Claims, 10 Drawing Figures

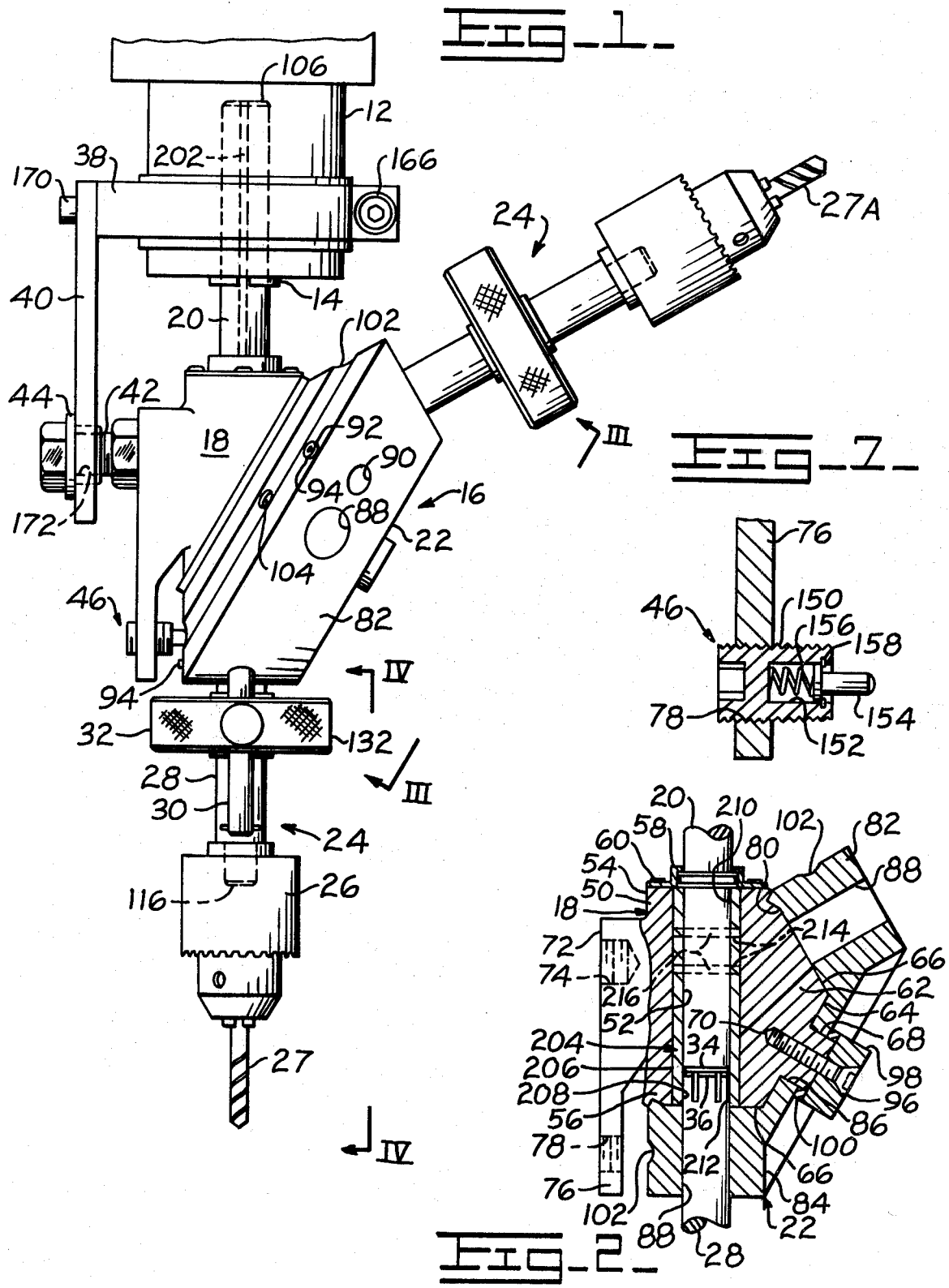

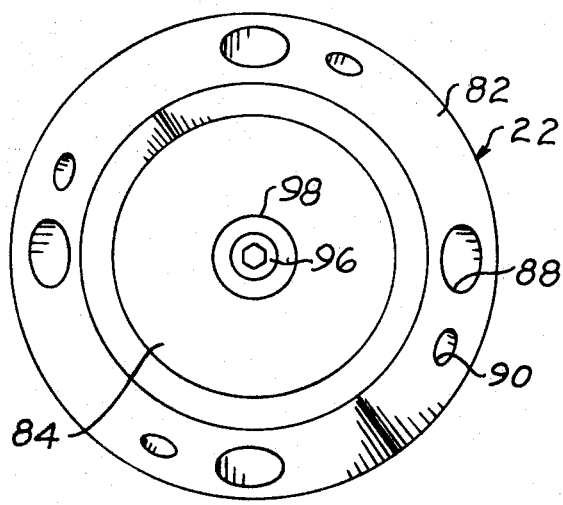
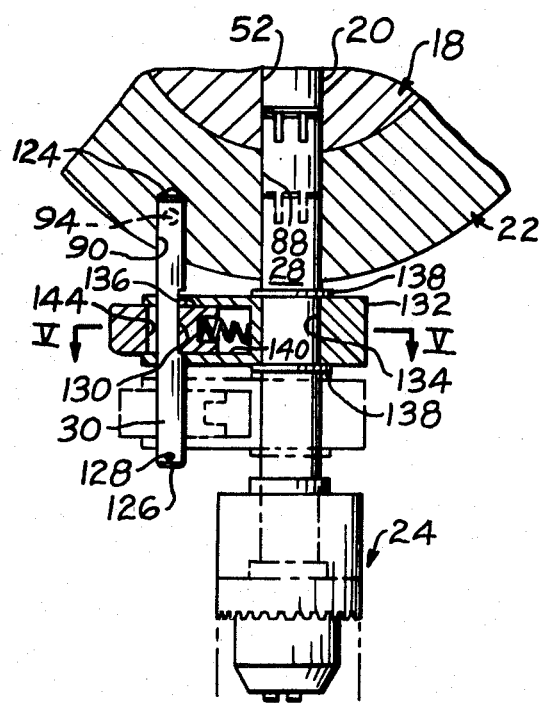
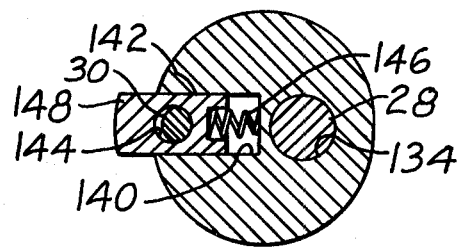

WEAR AND ALIGNMENT SLEEVE FOR POWER TOOL

BACKGROUND OF THE INVENTION

1. Field of the Invention

This invention relates generally to cutting by use of rotating, axially moving tools and more particularly to a machine including a turret of tools.

2. Description of the Prior Art

Generally, powered machine tools have provided multiple tool driving attachments wherein a turret includes a plurality of chucks positionable so as to be driven by a single powered driver. The turret is mounted to rotate about a hub. This is convenient since a variety of attachments are mounted in each chuck and readily available for positioning to be powered by the driver. This eliminates changing various attachments into and out of a single chuck. The single powered driver is rotatably mounted in a bore formed through the hub. A driven member, rotatably mounted in the turret can be aligned with and then engaged with the driver in the hub bore. Rotation of the driver and driven member in the hub bore can cause excessive wear in the hub causing the bore to enlarge. As a result, the driver and driven member can become sloppy or loose while engaged in the hub. This causes alignment to be difficult and accelerates further wear in the hub bore.

In view of the above, it would be advantageous to provide a multiple tool driving attachment including a means for limiting wear between the shafts and hub bore and for assuring good alignment.

SUMMARY OF THE INVENTION

The present invention is directed to overcoming one or more of the problems as set forth above.

According to the present invention this is accomplished by providing a power tool including a turret rotatably mounted on a hub, a first or driving shaft rotatably mounted in the hub and a second or driven shaft mounted for rotation in the turret and for aligned rotating engagement with the first shaft in the hub. A sleeve is provided in the hub and is connected to the first shaft. The sleeve extends from the first shaft for receiving the second shaft. Thus, the sleeve preferably extends substantially along the entire length of the hub bore so that engagement between the first and second shafts occurs within the sleeve and so that the engaged shafts are maintained from rotating in direct contact with the hub bore. Means are provided for venting between the first and second shafts.

The foregoing and other advantages will become apparent from the following detailed description of the invention when considered in conjunction with the accompanying drawings. It is to be expressly understood, however, that the drawings are not intended as a definition of the invention but are for the purpose of illustration only.

BRIEF DESCRIPTION OF THE DRAWINGS

In the drawings:

FIG. 1 is a side elevation illustrating the preferred multiple tool driving turret attachment of this invention;

FIG. 2 is a partial cross-sectional side elevation illustrating the sleeve and a portion of the attachment of FIG. 1;

FIG. 3 is a frontal view of the turret taken along lines III—III of FIG. 1;

FIG. 4 is a frontal view of the attachment in partial cross-section taken along lines IV—IV of FIG. 1;

FIG. 5 is a cross-sectional view taken along the lines V—V of FIG. 4;

FIG. 6A is an elevational view illustrating a portion of the first tool driving member of this invention;

FIG. 6B is an end view of the first tool driving member of FIG. 6A;

FIG. 6C is an elevational view illustrating a portion of the second tool driving member of this invention;

FIG. 6D is an end view of the second tool driving member of FIG. 6C; and

FIG. 7 is a partial cross-sectional side elevation illustrating a resiliently urged member for aligning the first and second tool driving members of this invention.

DETAILED DESCRIPTION

Referring now to the drawings, FIG. 1 illustrates the environment of this invention. For example, a well known tool driving machine, such as a drill press, vertical mill or the like, is generally designated 10. Such tool driving machines generally include a column 12 having a rotatable driving member such as spindle 14 powered by a power source such as an electric motor (not shown).

A common attachment to tool driving machine 10 is a multiple tool driving turret attachment generally designated 16 and including a hub 18. A first tool driving means or shaft 20 is mounted for rotation in hub 18. Shaft 20 may be secured to and powered by spindle 14. A turret 22 is mounted for 360 degree rotation on hub 18 and includes a plurality of second tool driving means generally designated 24. Such second tool driving means 24 includes well known chucks 26 and their associated shafts 28. By virtue of the turret 22 being rotatable on hub 18, second tool driving means 24 may be moved relative to hub 18 so that shaft 28 is aligned with shaft 20. Upon engagement of shafts 28 and 20, the power supplied by tool driving machine 10 is transmitted through spindle 14 and shaft 20 to shaft 28 and ultimately to chuck 26. Thus, a plurality of chucks 26 may be equipped with various tool attachments such as different sized drill bits 27,27a, taps and the like, providing the operator of machine 10 with the ability to make relatively quick changes for tooling operations by selective positioning of turret 22 on hub 18 without the necessity of turning off the power to machine 10 while making such tooling changes.

Generally, the environment of the present invention includes an end 34 of shaft 20, keyed for mating engagement with an aligned keyed end 36 of shaft 28, and means operable, in response to the alignment of shafts 20 and 28, for guiding and locking shaft 28 into and out of rotating engagement with shaft 20 when shaft 20 is rotating. Such operable means generally includes a guide shaft 30. A resilient locking device 32 is included for locking shafts 20,28 into engagement. A collar 38 clamps onto column 12 and a slide 40 is connected to and extends from collar 38. Hub 18 connects to slide 40 by means of a bolt 42 extending through a resilient grommet 44. Further, the environment of this invention includes resiliently urged means, 46 in FIG. 1, operably connected for aligning first and second shafts 20,28, respectively.

More specifically now, a preferred hub 18, FIG. 2, is of cast iron but can be made of other suitable material.

Hub 18 includes a first portion 50 including an annular through-bore 52 for accommodating shaft 20 and sleeve 204 for rotation therein. Bore 52 extends through portion 50 from a first end 54 to a second end 56. A suitable bearing collar 58 is attached to first end 54 of bore 52 by screws 60. A second portion 62 is generally frustoconical and includes surfaces 64,66 for receiving turret 22. A portion 68 protrudes from surface 64 through turret 22 and includes a threaded aperture 70 therein. A flange 72, formed with hub 18 includes a threaded aperture 74 formed therein for receiving bolt 42. Flange 72 also includes flange arm 76 including a threaded aperture 78 formed therein for receiving resiliently urged aligning means 46 therein.

Turret 22, FIGS. 1, 2 and 3, is generally annular and preferably of cast aluminum. The turret includes generally concave surface 80 usually lubricated for mating, rotating engagement with surfaces 64,66 of hub 18. The turret also includes generally convex surface 82 having an annular relief 84 therein. An opening 86, best shown in FIG. 2, is formed through turret 22 for receiving protruding portion 68. A plurality of annular bores 88 are formed through turret 22 for slidably receiving shafts 28 therethrough, see FIGS. 1, 2, 3. Bores 88 are preferably annularly spaced about turret 22. Bores 88 are of the same diameter as bores 52. Depending on the size of turret 22, the number of bores 88 may vary. A second plurality of blind bores 90, FIGS. 1, 3, are provided in surface 82 for receiving guide shafts 30 therein. A third plurality of blind bores 92 are formed in turret 22 and extend to intersect bores 90. Bores 92 are threaded to receive set screws 94 for engagement with, and securing of, guide shafts 30 in bores 90. Turret 22 is preferably rotatably secured to hub 18 by a well known screw 96, thrust washer 98 and washer 100. Screw 96 is received into threaded aperture 70 of hub 18. An annular groove 102 may be provided in turret 22 for guiding resiliently urged alignment means 46 along the turret. However, turret 22 rotates in a fixed path relative to alignment means 46 so that formation of a groove 102 is not essential. Whether or not groove 102 is provided, a plurality of detents 104 are necessary to receive resiliently urged alignment means 46. Detents 104 are located on turret 22 to engage alignment means 46 at selective positions providing for alignment of bores 52,88 and their respective shafts 20,28.

First tool driving means or shaft 20, FIGS. 1 and 2, is mounted for rotation in bore 52 of hub 18. Shaft 20 is preferably of a suitable steel and includes a first end 106 secured in collar 12 by spindle 14 as is well known. Shaft 20 extends from spindle 14, through collar 58 and teminates within bore 52 at a keyed second end 34. Shaft 20 must not extend beyond surface 66 of hub 18, otherwise the shaft would interfere with relative movement between turret 22 and hub 18. Shaft 20 is secured by collar 58 to permit rotation within hub 18 but to limit axial movement within the hub. Keyed end 34 of shaft 20, FIGS. 6A-B, includes a protruding annular portion 108 having a slot 110 formed therein. A steel tab 112, retained in slot 110 by a pin 114, forms a single keyed member on shaft 20. A vent 202, see FIGS. 1, 6A and 6B, provides a route for venting air in hub 18 between first and second shafts 20,28 to the atmosphere.

Second tool driving means 24, FIG. 1, are each movably mounted on hub 18 for alignment with shaft 20 by virtue of their attachment to turret 22. Each of the second tool driving means includes a well known, commercially available chuck 26 for accommodating any of several well known bits used with such chucks such as drill bits 27,27a, mills, taps, or the like, and a shaft 28 secured to chuck 26 at a first end 116 and terminating at a keyed second end 36, see FIGS. 1 and 6D-C. Shaft 28 is the same diameter as shaft 20 and is secured to chuck 26 for rotation therewith. Keyed end 36 of shaft 28 includes a plurality of keyways or slots 118 sufficient for receiving tab 112. Slots 118 intersect through annular recess 120 sufficient for receiving protruding annular portion 108. Surfaces 122, between each slot 118, are rounded to guide tab 112 into any one of the slots 118.

Means are operable for moving shaft 28 into and out of rotating engagement with shaft 20. This is accomplished by the use of guide shaft 30 and resilient locking device 32. Shaft 30 can be of any suitable material but is preferably of steel. Shaft 30 is of a smaller diameter than shaft 20 and 28. First end 124 of shaft 30 may be inserted into bore 90 of turret 22 and secured therein by set screw 94, see FIGS. 1 and 4. Shaft 30 thus protrudes from turret 22 and terminates at second end 126 including pin 128 inserted therethrough. A notch 130 is formed in shaft 30 between ends 124,126 for receiving a portion of resilient locking device 32. Resilient locking device 32 comprises an annular aluminum housing 132 including an axial bore 134 for receiving shaft 28 for rotation therein and an axial bore 136 for receiving shaft 30 therethrough, see FIGS. 4 and 5. Thus, locking device 32 interconnects shafts 28 and 30. Shaft 28 is locked into fixed relationship with housing 132 by snap rings 138 to permit shaft 28 and housing 132 to move toward and away from shaft 20. Shaft 30 is slidably engaged in bore 136. A radially directed blind bore 140 is formed in housing 132 and intersects bore 136. A tab 142 is resiliently mounted in blind bore 140 by spring 146. An axial bore 144 is provided through tab 142. Bore 144 is the same diameter as bore 136 for slidably receiving shaft 30. Thus, due to the presence of notch 130, tab 142 is urged into locking engagement with shaft 30 as shaft 28 and housing 132 are slidably moved in bore 88 toward shaft 20. Similarly, tab 142 may be hand depressed at button end 148 so as to be urged out of locking engagement with notch 130.

Resiliently urged aligning means 46, FIGS. 1 and 7, is preferably provided by threaded member 150 mounted in threaded aperture 78 of flange arm 76. Blind bore 152, formed in member 150, includes a plunger 154, preferably of a suitable synthetic material, resiliently urged by spring 156, or the like, against a stop 158 for limited movement relative to member 150. Threaded member 150 is commercially available. Plunger 154 is urged into groove 102 by spring 156 or, in the absence of a groove, against turret 22 until the plunger is urged into one of the detents 104 indicating alignment of bores 52,88 and their respective shafts 20, 28.

Means such as sleeve 204, FIG. 2, is preferably of a suitable hardened steel and is generally tubular having an outside surface 206, and inside surface 208, an open first end 210 and an open second end 212. The purpose of sleeve 204 is to limit wear between shafts 20,28 and bore 52 and stabilize alignment of shafts 20,28 in bore 52. Thus, sleeve 204 functions both as a shaft coupling device and as a wear limiting device. Outside surface 206 is of a diameter suitable to permit a lubricated slip fit within and substantially along the entire length of bore 52. In this manner, sleeve 204 can rotate within bore 52. Inside surface 208 is of a diameter suitable to accomodate shaft 20 and to permit shaft 28 to have a lubricated slip fit suitable for rotation of sleeve 204. Parallel bores or holes 214 are preferably drilled laterally through sleeve 204 and shaft 20 in a direction normal to and intersecting the concentric centroidal axes of sleeve 204 and shaft 20. Steel roll pins 216 are press fit through bores 214 for fixedly interconnecting sleeve 204 and shaft 20. In this manner, sleeve 204 and shaft 20 can rotate as a unit in bore 52.

First end 210 of sleeve 204 terminates adjacent collar 58 and second end 212 of sleeve 204 terminates adjacent turret 22 so as not to interfere with rotation of turret 22 on hub 18. Preferably, second end 212 is chamfered to permit easy entrance of shaft 28 into sleeve 204.

OPERATION

Attachment 16 is connected to machine 10 by securing clamp 38 to column 12. Hub 18 is limited from rotation by securing bolt 42 to slide 40. Also vibration damping between attachment 16 and machine 10 is enhanced by the use of grommet 44 between hub 18 and slide 40.

Second tool driving means 24 is secured to turret 22 due to shaft 30 being retained in bore 90 by set screw 94. For rotation of turret 22 on hub 18, shaft 28, resilient locking member 32 and chuck 26 move as a unit to retract shaft 28 from bore 52 and out of engagement with shaft 20. This is accomplished by hand depressing button end 148 to release tab 142 from notch 130. Thus with bores 144, 136 aligned, locking member 32, shaft 28 and chuck 26 are movable on guide shaft 30 to a position where locking member 32 engages pin 128, see FIG. 4. In this mode, turret 22 may be freely rotated on hub 18. This can be accomplished when shaft 20 is rotating due to power supplied by machine 10 through spindle 14.

Assuming that shaft 20 is rotating, and a specific tool operation is to be performed, the chuck 26 which holds the desired tool may be rotated with turret 22 to the lowermost position directly below and aligned with column 12. As turret 22 is rotated, plunger 154 tracks on turret 22 and automatically snaps into and out of detents 104. When plunger 154 snaps into a detent 104 and the desired chuck is directly below column 12, this indicates that bore 52, including sleeve 204, and one of the associated bores 88 are aligned. Also, shaft 20 and an associated shaft 28 are aligned. Upward force applied to second tool driving means 24 will urge shaft 28 upwardly, guided by shaft 30 and lock 32. With the upward force maintained, tab 112 will be felt to engage rounded surfaces 122 which ultimately will guide tab 112 into one of the slots 118. Simultaneously, shaft 28 will begin to rotate and tab 142 will be in position to snap into engagement with notch 130 for maintaining shafts 20,28 in locked rotating engagement. The above procedure can be repeated for selectively disengaging and engaging any of the second tool driving means with the first tool driving means.

Advantageously, sleeve 204 extends substantially entirely along the length of bore 52. Thus, when shafts 20,28 are engaged within sleeve 204 they rotate as a unit along with sleeve 204 within bore 52. As a result, excessive wear causing premature enlargement of bore 52 is substantially limited since alignment of shafts 20,28 is maintained by inner surface 208 of sleeve 204. Possible misalignment of engaged shafts 20,28 rotating in bore 52, and the resultant excessive wear caused thereby is avoided due to the coupling effect of sleeve 204 as it engages a portion of shaft 20 and a portion of shaft 28 adjacent the point at which those shafts are engaged.

The foregoing has described a tool driving attachment for use with a powered tool driving machine. First and second tool driving members may be selectively engaged and disengaged while they are rotating.

What is claimed is:

1. A tool driving attachment of the type including a turret rotatably mounted on a hub, a first shaft rotatably mounted in the hub and a second shaft mounted for rotation in the turret and for aligned rotating engagement with the first shaft in the hub, the improvement comprising:
   a sleeve extending through the hub and having a first end connected to the first shaft; and
   means for venting between the first and second shafts, said means including a bore extending between first and second ends of the first shaft.

2. The tool driving attachment of claim 1 wherein the sleeve further includes a second end extending from the first shaft, said second end terminating adjacent the turret.

3. The tool driving attachment of claim 2 wherein the sleeve is rotatably mounted in the hub.

4. A tool driving attachment of the type including a turret rotatably mounted on a hub, a first shaft rotatably mounted in the hub and a second shaft mounted for rotation in the turret and for aligned rotating engagement with the first shaft in the hub, the improvement comprising:
   means for limiting wear between the first and second shafts in the hub, said means being a sleeve extending through the hub having a first end fixedly connected to the first shaft for rotation therewith and a second end extending from the first shaft for receiving the second shaft; and
   means for venting between the first and second shafts, said means for venting including a bore extending between first and second ends of the first shaft.

5. A tool driving apparatus comprising:
   a hub including a bore formed therethrough;
   first shaft means for rotating said hub;
   a turret rotatably mounted on the hub;
   second shaft means for rotating in said turret and for rotating engagement with the first shaft means in the hub;
   means for limiting wear between the first and second shaft means in the hub and for staabilizing alignment between the first and second shaft means, said means for limiting wear including a sleeve extending through the hub having a first end fixedly connected to the first shaft means for rotation therewith and a second end extending from the first shaft and terminating adjacent the turret for receiving the second shaft means; and
   means for venting between the first and second shafts, said means for venting comprises a bore extending between first and second ends of the first shaft.

* * * * *